US008521760B2

(12) United States Patent
Das et al.

(10) Patent No.: US 8,521,760 B2
(45) Date of Patent: Aug. 27, 2013

(54) DYNAMIC TRANSLATOR FOR REQUESTS FOR SYSTEM RESOURCES

(75) Inventors: Abhinav Das, Sunnyvale, CA (US); William Y. Chen, Los Altos, CA (US); Jiwei Lu, Pleasanton, CA (US); Chandramouli Banerjee, Fremont, CA (US)

(73) Assignee: Oracle America, Inc., Redwood City, CA (US)

( * ) Notice: Subject to any disclaimer, the term of this patent is extended or adjusted under 35 U.S.C. 154(b) by 731 days.

(21) Appl. No.: 12/345,810

(22) Filed: Dec. 30, 2008

(65) Prior Publication Data

US 2010/0169308 A1 Jul. 1, 2010

(51) Int. Cl.
G06F 7/00 (2006.01)
G06F 17/30 (2006.01)

(52) U.S. Cl.
USPC .......................................................... 707/760

(58) Field of Classification Search
USPC .......................................................... 707/760
See application file for complete search history.

(56) References Cited

U.S. PATENT DOCUMENTS

| | | | | | |
|---|---|---|---|---|---|
| 5,909,545 | A | * | 6/1999 | Frese et al. | 709/208 |
| 6,081,842 | A | * | 6/2000 | Shachar | 709/229 |
| 7,139,811 | B2 | * | 11/2006 | Lev Ran et al. | 709/217 |
| 2006/0293875 | A1 | * | 12/2006 | Stanfill et al. | 704/2 |
| 2010/0114555 | A1 | | 5/2010 | Das et al. | |
| 2010/0115497 | A1 | | 5/2010 | Das et al. | |
| 2010/0169308 | A1 | | 7/2010 | Das et al. | |
| 2010/0274551 | A1 | | 10/2010 | Das et al. | |

OTHER PUBLICATIONS

Nieuwejaar, et al., "BrandZ: A Linux. Environment in A. Solaris Zone," Solaris Kernel Technology, Sun Microsystems, 32 pages.
Transitive Corporation, "Cross-Platform Virtualization Products," http://www.transitive.com/products, Dec. 2, 2008, 1 page.
Transitive Corporation, "Personal Productivity—QuickTransit Workstation" http://www.transitive.com/solutions/workstation, Dec. 2, 2008, 1 page.
Transitive Corporation, "What is a SolarisWorld?" https://train.transitive.com/knowledge/solution/57 Jan. 7, 2009.

* cited by examiner

*Primary Examiner* — Fred I Ehichioya
*Assistant Examiner* — Kris Mackes
(74) *Attorney, Agent, or Firm* — Meyertons, Hood, Kivlin, Kowert & Goetzel, P.C.

(57) ABSTRACT

Techniques for selectively translating resource requests from a program running on a computer system are disclosed. The resource request may be a request to access a file, library file, API, etc. The resource request may be a system call or library call. The computer program may be non-native to the computer system. Translation of resource requests may occur within the operating system or outside it. A resource request containing a reference to a first path and file name may be selectively translated by altering the resource request to contain a reference to a second path and file name. After selectively translating a request, he request is caused to be serviced. A resource request may be serviced by forwarding it to an operating system, and a result may be sent back to the program.

20 Claims, 8 Drawing Sheets

*400*
| Translation Table | |
|---|---|
| /usr/include/sys/ | /x86/usr/include/sys/ |
| /home/joesmith/file6 | /home/joesmith/file22 |
| /home/joesmith/file7 | /home/janedoe/file7 |
| /home/horse/ofcourse | /home/camel/trammel |
| /usr/sbin/ | /usr/x86/sbin/ |
| /sbin/ | /x86/sbin/ |
| /lib/ | /translate/lib/ |
*FIG. 4A*
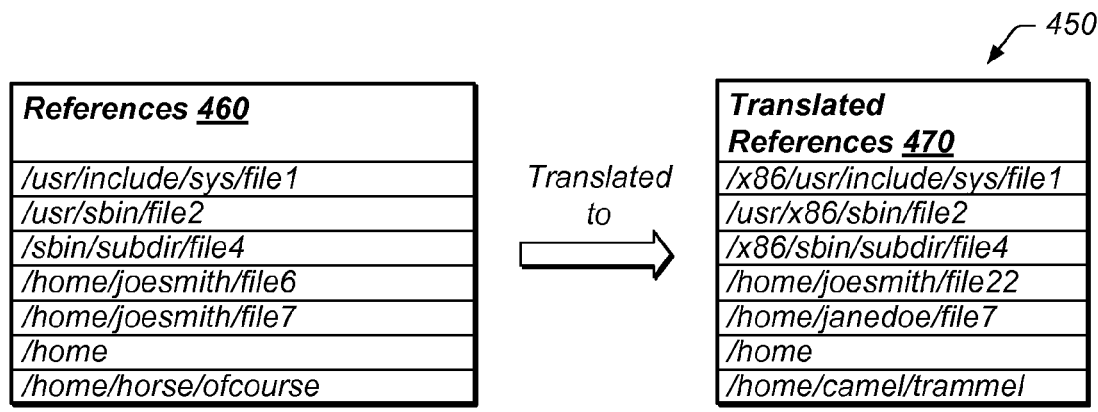
*FIG. 4B*
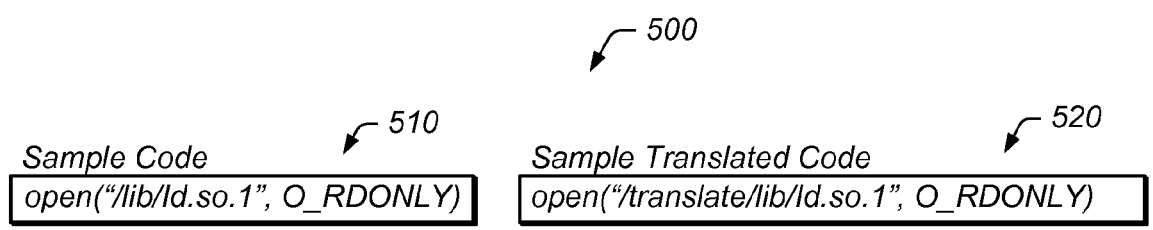
*FIG. 5*

US 8,521,760 B2

DYNAMIC TRANSLATOR FOR REQUESTS FOR SYSTEM RESOURCES

BACKGROUND OF THE INVENTION

1. Field of the Invention

This disclosure relates to the translation of requests for computer system resources.

2. Description of the Related Art

During the course of its operation, a program running on a computer system may need to access certain system resources, such as files or libraries. If a request for a particular resource is successful, the program is thus able to gain access to the resource and continue execution. If, on the other hand, the requested resource is not present at the location expected by the request or the requested resource is incompatible with the requesting program, an error may occur. Such an error may have an adverse effect on the operation of the program. The problem of unsuccessful resource requests is particularly acute (although by no means limited to) the situation where the program has been written or compiled for a first computing platform, but is executing on a second (different) computing platform.

SUMMARY

Various techniques for selectively translating requests for computer resource requests are disclosed.

In one embodiment, a method is disclosed in which a resource request is received at a request translator from a program running on a computer system. The request translator makes a determination as to whether the resource request contains any references that require translation. If the resource request requires translation, the resource request is altered, and the request translator causes a version of the altered request to be serviced. If no alteration is performed, the request translator causes an unaltered version of the request to be serviced.

In various embodiments, the resource request may contain a reference to a file, library file, process, device, API, or other resource. A resource may be an object. A resource may be external to the computer system. The resource request may be, for example, a system call or a library call, and the reference may be one of the parameters to the system call or library call.

The program may be non-native with respect to the computer system on which it is running. The program may also be under the control of a control application. In one embodiment, the control application is capable of dynamically executing non-native program binaries, and the request translator is a component of the control application. Alternate sets of system and/or library files for use with a non-native program may be present on the computer system, and resource requests by a non-native program may be selectively translated such that the translated resource requests are directed toward the alternate set of files.

The techniques of the present disclosure are not limited, however, and the program may also be a native program. Both native and non-native programs may be subjected to dynamic selective resource request translation, with the effect that the programs executed in a different computing environment (or system configuration) than they would if resource request translation were not performed. Executing a program in a different computing environment may cause the program behavior to change, and may even allow the program to be operative on a computer system where it may have been non-operative before. The program may be any type of program, including a compiled program, a program being interpreted (such as a script), a program called from within another program, etc.

In one embodiment, a request translator receives an input resource request from a program and selectively determines whether the resource request is to be translated. The request translator may be a component of an operating system. The step of selective translation may be performed in part by accessing a data store, which may contain translation tables and/or translation rules. In the above embodiment, if it is determined that the resource request is to be translated, the resource translator outputs a translated resource request that may contain at least one translated reference. Multiple references within one resource request may be translated. If no translation is required, the output resource request appears as an unaltered version of the input resource request. The request translator then causes the output resource request to be serviced. The request translator may cause the request to be serviced by sending the output resource request to an API of an operating system. The request translator may also cause the request to be serviced by sending it to another entity capable of servicing the request (e.g., an object request broker, a database, an API not within the operating system, or any other appropriate entity.) After the request is serviced, a result may be returned to the calling program. The result may return a particular value, or allow the program to access a particular resource. For example, the result of a system "file open" call may be a handle to a file (file descriptor) resulting from the "file open" call.

In a further embodiment, a system is disclosed that includes one or more processors, I/O devices, and a memory subsystem, where the memory subsystem further includes program instructions executable by the one or more processors. The program instructions are executable by the one or more processors to dynamically translate resource requests and cause the requests to be serviced, and otherwise implement the techniques described herein.

In still further embodiments, tangible computer-readable memory media for implementing various disclosed techniques are also contemplated.

BRIEF DESCRIPTION OF THE DRAWINGS

FIGS. 4A-B include tables depicting examples of request translation.

FIG. 5 is an example illustrating translation of a code fragment.

DETAILED DESCRIPTION

Figure 1A:
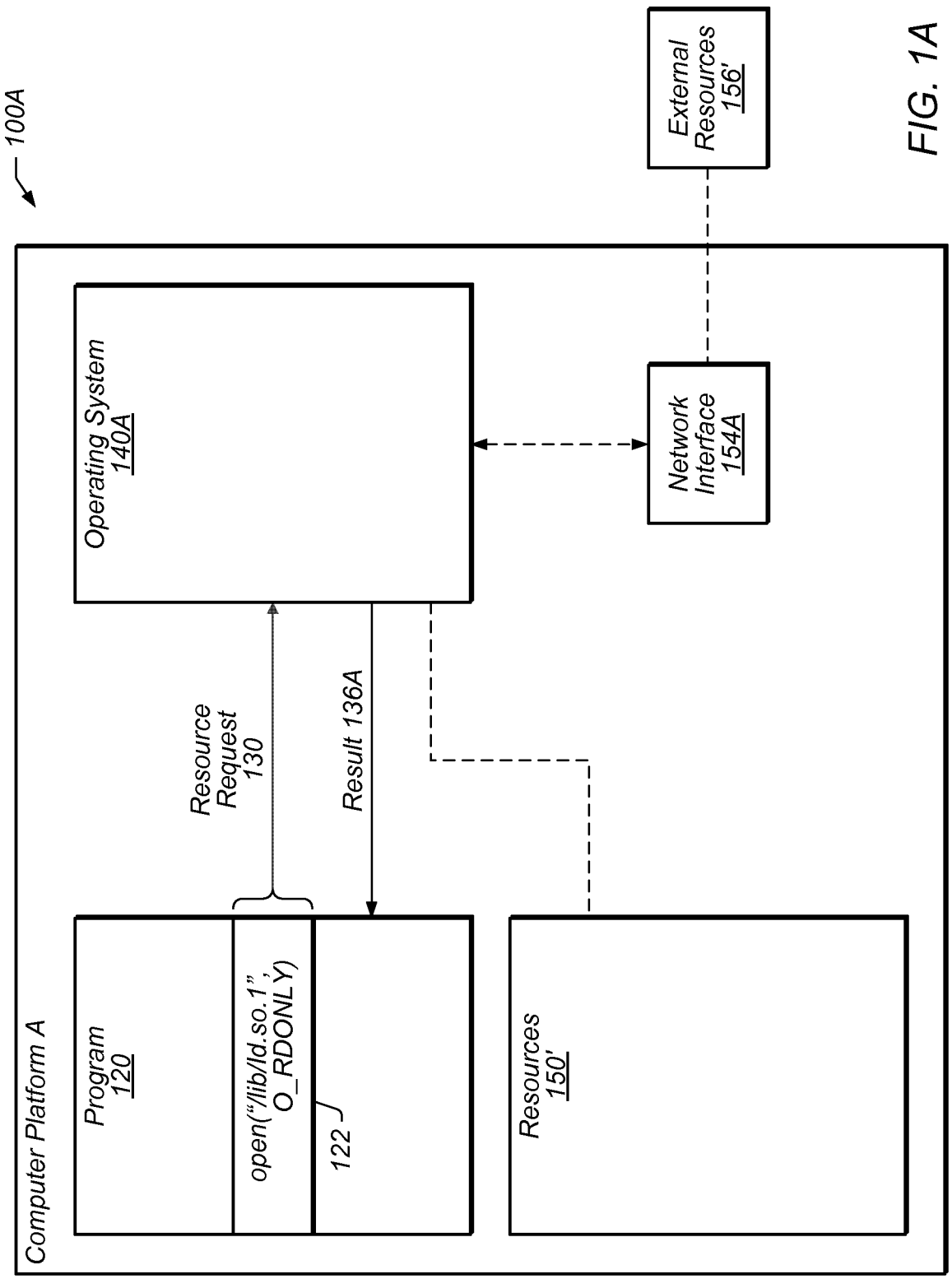
FIG. 1A is a block diagram illustrating a program that makes a resource request to an operating system running on a first computer platform.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Terminology. The following paragraphs provide definitions and/or context for terms found in this disclosure (including the appended claims):

"Comprising." This term is open-ended. As used in the appended claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Computer System." This term has its ordinary and accepted meaning in the art, and includes one or more computing devices operating together and any software stored thereon. A computing device includes at least one or more processor units and a memory subsystem. A memory subsystem may store program instructions executable by the one or more processor units. An exemplary computer system is described in more detail with reference to FIG. 6.

"Processor unit." This term includes any circuitry that is configured to execute program instructions (e.g., a central processing unit (CPU)). As used herein, a "processor unit" may refer to a computer subsystem having one or more processors. A processor may have one or more processing "cores" on a single die. A processor unit may be distributed across multiple dies.

"Configured." As used herein, this term means that a particular piece of hardware or software is arranged to perform a particular task or tasks when operated. Thus, a computer system that is "configured to" perform task A means that the computer system includes a circuit, program instructions stored in memory, or other structure that, during operation of the computer system, performs or can be used to perform task A. (As such, a computer system can be "configured to" perform task A even if the computer system is not currently on.) Similarly, a computer program that is "configured to" perform task B includes instructions, that if executed by a computer system, perform task B.

"Software." This term has its ordinary and accepted meaning in the art, which includes computer programs of any form; programs include sets of instructions that, when executed by a processor unit, direct the operation of a computer system.

"Program." This term is to be interpreted according to its ordinary and accepted meaning in the art, which includes executable files, script files, etc. . . . Executable files are generally compiled, at least partially, prior to run time. Script files are generally interpreted at run time.

"Operating System (OS)." This term is to be interpreted according to its ordinary and accepted meaning in the art, which includes one or more programs designed to control the execution of other programs. Such control may include one or more of the following actions: scheduling other programs, debugging other programs, controlling input and/or output of other programs, assigning storage to other programs, managing data of other programs, etc.

"Application." As used herein, this term refers to a program that is distinct from an operating system of a computer system.

"Computer Platform." As used herein, this term refers to a computer system having a particular configuration or properties (e.g., a particular instruction set architecture associated with the processor unit of the computer system). A first computer platform may be incompatible with a second computer platform depending on the relative configuration or properties of the two platforms. For example, the two platforms might have incompatible instruction set architectures.

"Native Software/Non-native Software." As used herein, a particular program or piece of software is "native" to a particular computer platform if its executable code is in an instruction set architecture associated with the processor unit of the computer platform. As used herein, a particular program or piece of software is "non-native" (or "not native") to a particular computer platform if its executable code includes at least one incompatibility with an instruction set architecture associated with the processor unit of the computer platform.

"System Call." As used herein, a "system call" is a program request made to, interpreted, or handled by an operating system. A system call includes a program request made to an operating system library through a predefined Application Programming Interface (API).

"Library Call." As used herein, a "library call" is a program request made to, interpreted, or handled by program instructions that are not part of an operating system.

"Service." As used herein, a request is said to be "serviced" when the request is completed, either successfully or unsuccessfully, with or without an associated error condition.

"Application Programming Interface (API)." This term is to be interpreted according to its ordinary and accepted meaning in the art, which includes a formalized set of software calls and routines for accessing certain hardware or software features of a computer system.

"Resource." As used in the context of a computer system, this term has its ordinary and accepted meaning in the art, which includes any physical or virtual component of limited availability within a computer system.

"Reference." As used herein, a "reference" is portion of a request that refers to a location, where the location is either local or remote to a computer system.

"Translation." As used herein, this term refers to the act of changing or altering. Consider a request to access the directory "/usr/lib". A translated version of this request might be "/x86/usr/lib".

Turning now to FIG. 1A, a block diagram of a computer system 100A ("Computer Platform A") is depicted. As shown, computer system 100A includes a program 120, operating system 140A, resources 150', and network interface 154A, which couples computer system 100A to external resources 156'.

Program 120 is running on operating system 140A. Program 120 includes code 122 that, when executed, causes a resource request 130 to be sent to operating system 140A. In FIG. 1A, resource request 130 is a system call. More particularly, code 122 is executable to invoke a system call to access the file "/lib/ld.so.1" in a read only mode. The particular instantiation of code 122 shown in FIG. 1A is of course exemplary.

Operating system 140A is configured to provide program 120 access to resources 150' of system 10A. Operating system 140A may also be configured to provide, via network interface 154A, program 120 access to resources 156' that are external to system 10A. After receiving resource request 130, operating system 140A causes the request to be serviced and returns a result 136A to the program 120. Result 136A may return a particular value, or allow program 120 access the resource indicated in resource request 130. For example, with respect to code 122 shown in FIG. 1A, result 136A may be a handle to a file resulting from the "open" system call.

Figure 1B:
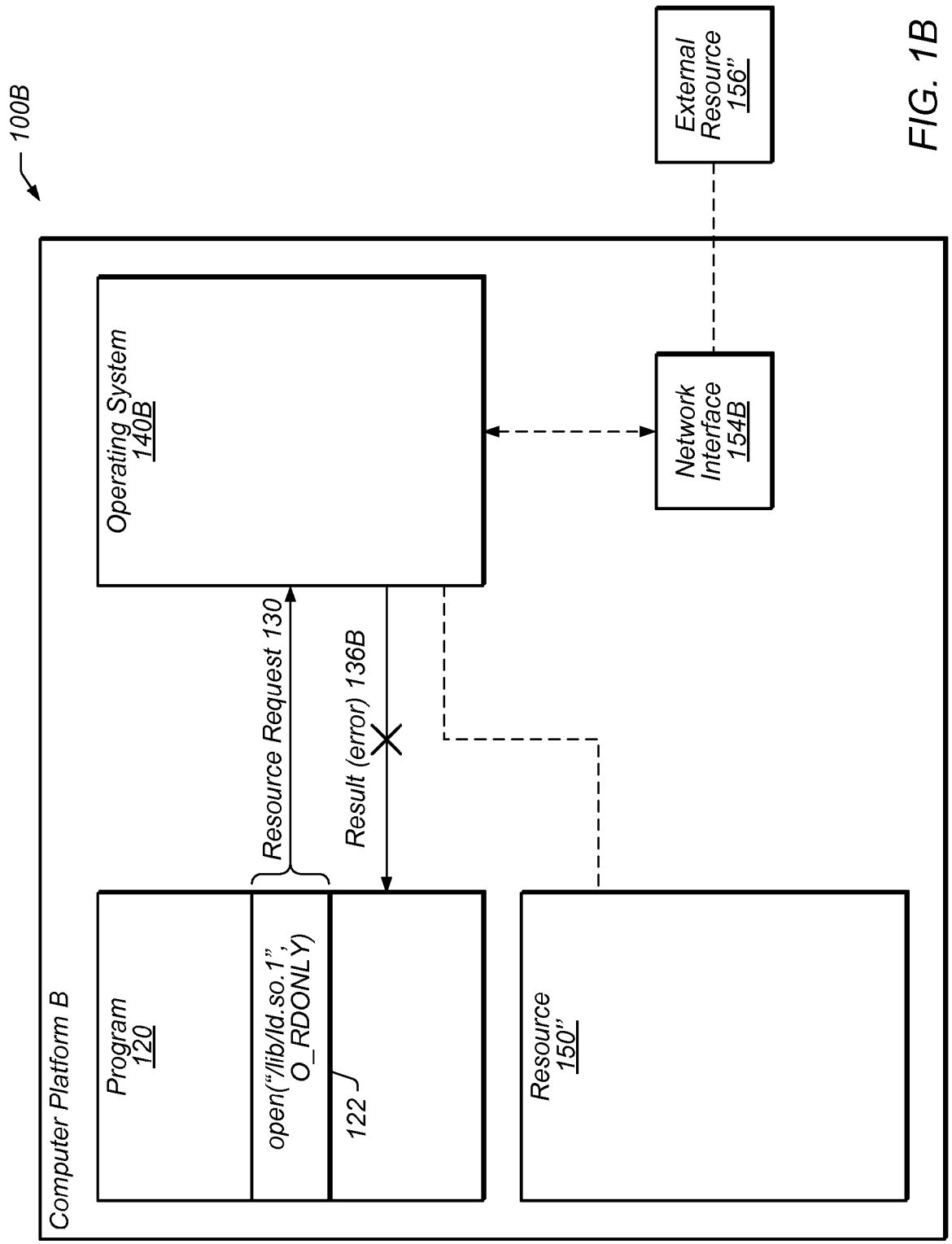
FIG. 1B is a block diagram illustrating the program of FIG. 1A making a resource request to an operating system of a second computer platform.

Turning now to FIG. 1B, a block diagram of a computer system 100B ("Computer Platform B") is depicted. Elements of FIG. 1B also found in FIG. 1A are numbered identically for convenience (e.g., program 120, code 122, request 130). Elements of FIG. 1B that correspond to those in FIG. 1A are numbered accordingly. Reference Numeral 150", for example, refers to a set of system resources that is distinct from resources 150' in at least one way.

As in FIG. 1A, code 122 in program 120, when executed, makes a resource request 130 to an operating system 140B. This request may be for resources 150" or 156". Unlike in FIG. 1A, in which operating system 140 returns a result 136A, operating system 140B returns a result 136B which connotes an error. This error condition might occur, for example, because resource request 130 contained a reference to a system file or library file that was incompatible with program 120. Resource request 136B sent to operating system 140B may also fail to be serviced for other reasons.

FIGS. 1A and 1B illustrate that a program such as program 120 might run successfully on one computer platform ("A") but unsuccessfully on another computer platform ("B"). In some instances, this incompatibility might result from program 120 being native to platform A but non-native to platform B. These and other situations may be ameliorated by one embodiment of a request translator described next with reference to FIG. 2A.

Figure 2A:
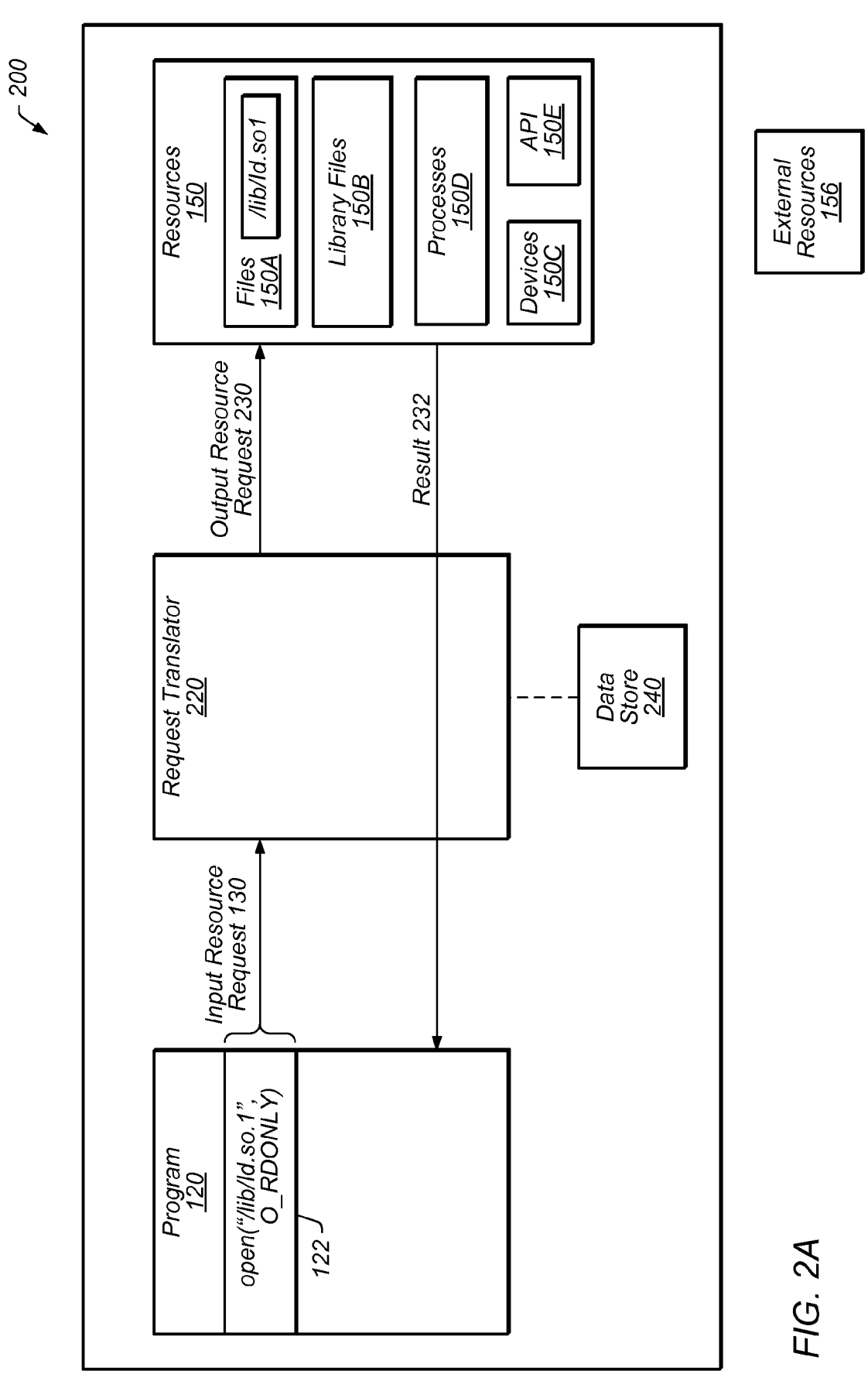
FIG. 2A is a block diagram illustrating a program making a resource request to a request translator.

Turning now to FIG. 2A, a block diagram of one embodiment of a computer system 200 is depicted. As shown, computer system 200 includes a program 120, a request translator 220, resources 150, and data store 240.

As in FIGS. 1A and 1B, code 122 within program 120, when executed, makes an input resource request 130. Note that program 120 can be any suitable type of program, and may be compiled or interpreted. In one embodiment, program 120 is called from within a script or other program. Program 120 may be a user application or a system application.

Input resource request 130 is received by a request translator 220. As will be described in further detail below, request translator 220 selectively translates input resource request 130 to an output resource request 230. In one embodiment, request translator uses data store 240 in determining whether to translate input resource request 130. Input and output resource requests 130 and 230 may be directed to one or more resources 150 or 156 of computer system 200. By conveying output resource request 230, request translator 220 causes output resource request 230 to be serviced, for example, by causing a result 232 to be sent to program 120 via translator 220.

Resources 150 can be any suitable resource of system 200, and may include files 150A, library files 150B, devices 150C, processes 150D, etc. Files 150A and library files 150B may include user files and system files. Files 150A and library files 150B may also include logical representations of devices 150C and processes 150D.

Files 150A and library files 150B may also include all known paths and files that are originally installed by an operating system on a first computer platform (e.g., that of computer system 200). In some embodiments, files 150A and library files 150B also include replicated copies of all known paths and files that are originally installed by an operating system on a second computer platform (e.g., one different from that of computer system 200). In this manner, paths and files originally installed by an operating system on a first computer platform may coexist on the same computer system with paths and files of an operating system of a second computer platform.

As one example, files 150A and library files 150B may include directories corresponding to a typical installation of UNIX having a SPARC instruction set (e.g., /lib, /usr, /etc) as well as directories corresponding to a typical installation of UNIX having an x86-based instruction set (e.g., /x86/lib, /x86/usr, /x86/etc).

In one embodiment, program 120 may be able to access external resources 156 via a network interface (not depicted). External resources 156 may comprise files, library files, devices, and processes residing in a location that is separate and/or remote from computer system 200. External resources 156 may be any suitable type of resource. Resources 150 or 156 are either specific to a particular computer platform or are independent from a particular computer platform.

Input resource request 130 received at request translator 220 is a request to access a resource 150 or 156. In one embodiment, input resource request 130 may be a system call (such as in the particular embodiment shown in FIG. 2A, in which the input resource request 130 is for opening the file "/lib/ld.so.1" in read-only mode).

In another embodiment, input resource request 130 may also be a library call—for example, to one of a plurality of libraries that are not provided as part of the original installation of an operating system. These libraries might be installed by various software and hardware vendors. Input resource request 130 is in no way limited only to system and library calls, however.

In one embodiment, program 120 making input resource request 130 may be non-native to computer system 200. For example, in one embodiment, computer system 200 is a computer platform whose processor unit is compatible with the SPARC instruction set, while program 120 is a binary executable compiled for the x86 instruction set, where program 120 contains at least one incompatibility with the SPARC instruction set. In such an embodiment, request translator 220 might be used to selectively translate references within resource requests by program 120 such that they are compatible with the environment of the platform of computer system 200. In another embodiment, computer system 200 is an IBM PC compatible laptop whose processor unit is associated with an x86 instruction set associated with its processor unit, while program 120 is a binary executable compiled for the PowerPC instruction set.

In still another embodiment, program 120 is specifically written or compiled for the platform associated with computer system 200 (e.g., program 120 is native.) In such an embodiment, request translator can also be used to selectively translate resource requests (e.g., by changing file names or path names in resource requests). For example, certain resources 150 of computer system 200 may be associated with a first system configuration, while other resources 150 may be associated with a second system configuration. Executing a native program 120 without translation of any resource requests may result in a certain program behavior corresponding with the first system configuration. By executing the same native program 120, but selectively translating the resource requests that it makes, the program behavior of native program 120 may thus differ, and correspond with the second system configuration.

One possible advantage to this approach is that a program running on a first computer platform, but compiled for an instruction set associated with a different computer platform, may access resources of the first computer platform without having to be recompiled. In many instances, recompilation is undesirable, as it takes too much time or computational resources. In other instances, recompilation is simply not possible (e.g., in the case of a program for which source code is not available). In executing a program running on a first computer platform but compiled for an instruction set associated with a different computer platform, a dynamic binary translator may be used.

Another advantage that may be present in some embodiments is that by translating (redirecting) requests for known system files and services, application behavior can be preserved. One example is the content of the directory "/usr/include/sys/". In one embodiment, the file content of this directory is platform specific. Another example is the linker, ld, which in one embodiment is tied to a target processor architecture. Selective translation of resource requests may allow the semantic behavior of an application to be maintained even when the application is run in a different computing environment.

By making entire multiple system environments (e.g., a host system environment and a target system environment) available to the request translator, the translation environment is more flexible than a restricted translation environment where only the target environment is accessible. In some embodiments, a casual user may observe that no special window, shell, or action needs to be used to translate a non-native program. In some embodiments, allowing the request translator to redirect requests for system files and services by predefined or user specified rules makes the translation process transparent to a user. In some embodiments, without changing an original computer platform environment, both native host applications and translated target applications can access common space data. In these embodiments, execution may remain unchanged for the native host application, while for the translated target application, known system files and user defined files are redirected, resulting in different program behavior.

In one embodiment, when an input resource request (e.g., 130) is received at request translator 220, translator 220 determines whether input resource request 130 includes a reference that is identified as requiring translation. In one embodiment, a reference may be an argument or part of a system or library call (e.g., a reference that identifies the location of a file to be opened). In general, the reference may be any information within a resource request that refers to or identifies an object on or accessible to computer system 200. For example, a reference may refer to a file or directory. A reference may also refer to a particular system call.

In one embodiment, request translator 220 selectively translates references in requests by making a determination as to whether a translation is to be performed. This process is described further with reference to FIG. 3. In one embodiment, computer system 200 includes or has access to a data store (any suitable type of memory, which may be accessible directly or via a software interface) that stores information that provides an indication of whether a particular reference should be translated or not. Examples of information that might be stored in data store 240 are described below with reference to FIG. 4. In such an embodiment, request translator 220 does not simply translate each received request; instead, a request is translated only if it is determined that translation is warranted. Accordingly, requests for which it is determined no translation is warranted are not altered.

Upon request translator 220 determining that input resource request 130 includes a reference that requires translation, request translator 220 translates (alters) the reference within request 130, producing output resource request 230. Translation may include changing a file name and/or a path name within request 130. Other forms of translation are also possible, such as altering a particular system or library call being performed by program 120.

For example, consider a reference that includes first file name and a first path name—e.g., /usr/lib/bin/test.exe, where "/usr/lib/bin" is the first path name and "test.exe" is the first file name. One form of translation that can be performed by request translator 220 is to alter both the first path name and the first file name (e.g., /usr/bin/test1.exe). Alternately, only the first path name (e.g., /usr/bin/test.exe) or the first file name (/usr/lib/bin/test1.exe) might be altered. Further examples of translation that may be performed by request translator 220 are described further below with reference to FIG. 4.

After altering input resource request 130, request translator 220 causes the altered request to be serviced. As one example, request translator 220 may send output resource request 230 to an API 150E of an operating system of computer system 200. As described in more detail below, output resource request 230 may be handled by an operating system or other appropriate entity. Upon request 230 being serviced, a result 232 of request 230 may be received and returned to program 120 via translator 220.

In one embodiment, an operating system may require that all files and services, in order to be opened and accessed, must go through the "open" system call. In this embodiment, at the time of the of the "open" system call, the path of a file or service to be opened is examined by the request translator. The path of the file or service to be opened may then be translated or "path mangled" by the request translator if it is determined that path mangling is necessary. If path mangling is necessary, all subsequent file manipulation uses the file descriptor that is passed back from the "open" system call, which corresponds to the location of an alternate file referenced in the translated request.

Figure 2B:
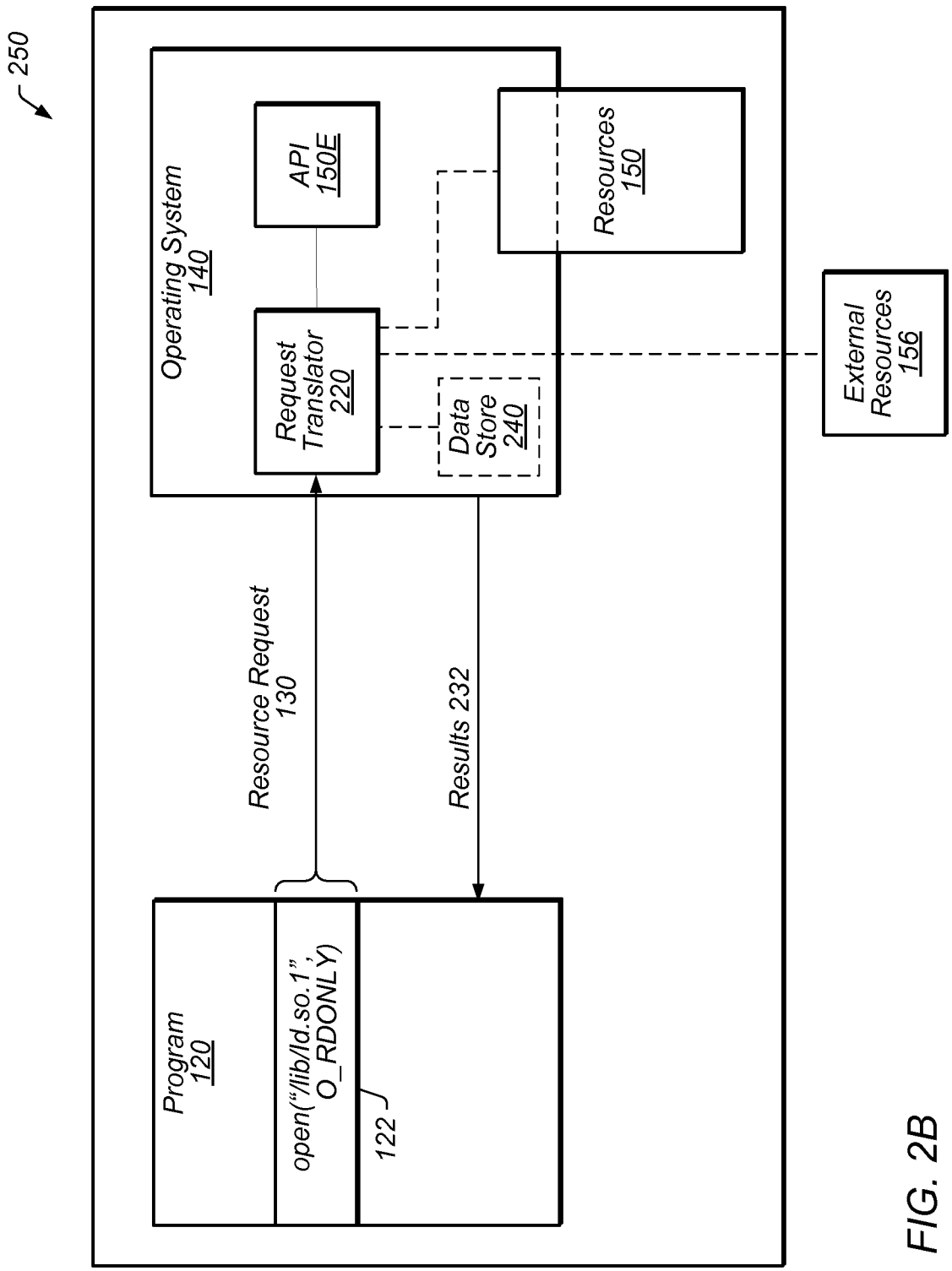
FIG. 2B is a block diagram illustrating a request translator running within an operating system.

Turning now to FIG. 2B, a block diagram of a computer system 250 is depicted. As shown, computer system 250 includes program 120, which, as in previous Figures, makes a request 130. In this embodiment, code implementing request translator 220 is located at least partially within operating system 140 of computer system 250.

Upon receiving request 130, translator 220 selectively translates request 130 as described above and causes request 130 to be serviced. For example, translator 220 may access an API 150E of operating system 140, receive one or more results, and provide the results to program 120. Alternately, translator 220 may selectively translate the request and access other resources 150 of computer system 250 or external resources 156 and provide one or more results to program 120.

Figure 2C:
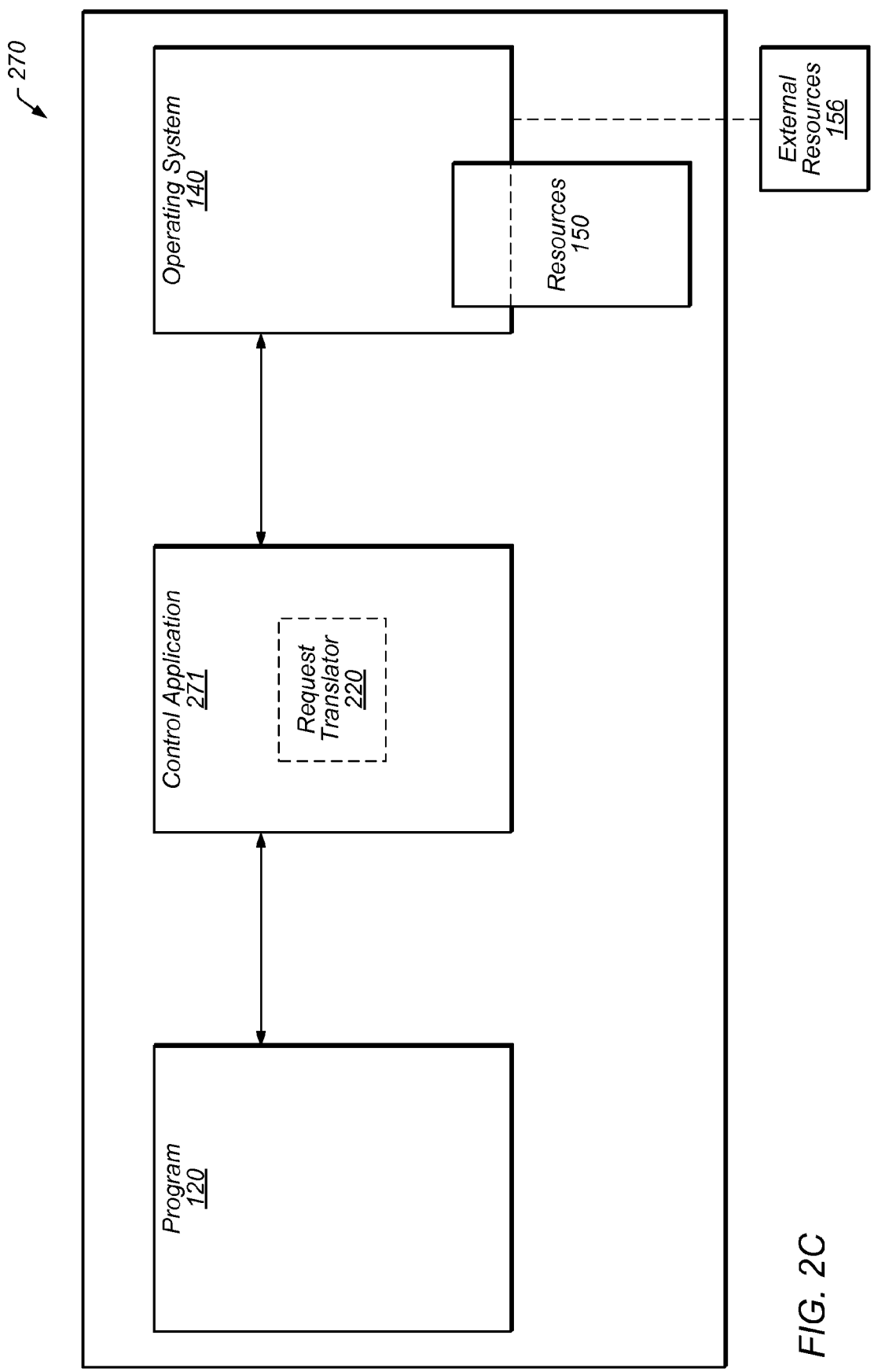
FIG. 2C is a block diagram illustrating a request translator running under control of an application.

Turning now to FIG. 2C, a block diagram of a computer system 270 is depicted. As shown, computer system 270 includes program 120, control application 271 (which includes request translator 220), and operating system 140. In one embodiment, control application 271 is executable on operating system 140 to control the execution of program 120. For example, control application 271 may be invoked, with program 120 identified to application 271 (e.g., by a command line parameter or via a user interface). In such an embodiment, program 120 runs under control of application 271, which is distinct from operating system 140. The code implementing translator 220 receives resource requests and handles them via selective translation as described above. For example, request translator 220 shown in FIG. 2C may pass system calls to an API (not shown) of operating system 140. In one embodiment, request translator 220 intercepts all system calls into the OS and determines whether to translate any references in a system call before transferring execution control into the operating system kernel. Alternatively, in another embodiment, request translator 220 intercepts a system call returning from the OS to a calling program and at that point determines whether to translate any references in the results of the system call. The "exec" class of system calls is one type of system call in which the path to the executable can be translated ("mangled") to redirect execution as desired. The implementations of request translator 220 in FIGS. 2B and 2C thus differ in the location of request translator relative to operating system 140. FIGS. 2B and 2C and their accompanying descriptions make clear that translator 220 may be located as part of operating system 140 or not.

In one embodiment, request translator 220 may be implemented as part of a program for performing translation, including the programs described in U.S. application Ser. No. 12/264,943, entitled "Handling Signals and Exceptions in a Dynamic Translation Environment," filed Nov. 5, 2008 which is incorporated by reference herein in its entirety.

Figure 3:
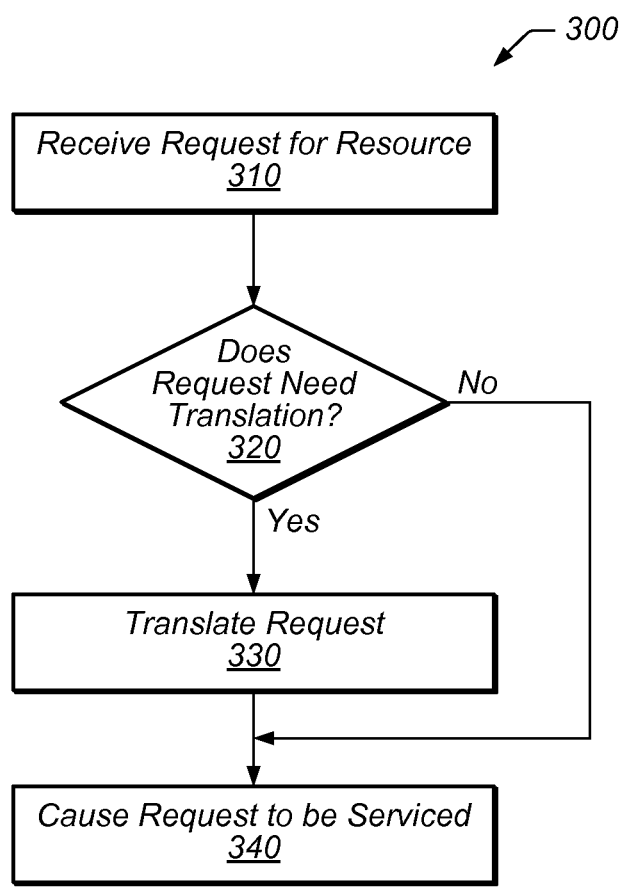
FIG. 3 is a flowchart of one embodiment of a method for performing selective request translation.

Turning now to FIG. 3, a flowchart of one embodiment of a method 300 performed by request translator 220 is depicted.

In step 310, a request (e.g., request 130) for a resource request is received. As has been described above, the request may be for any resource of or accessible to a computer system such as system 200. The request may be made by any type of program, including a compiled program, a program being interpreted, a program called from within another program, etc. As has been described, the request may, in some embodiments, be a system call or a library call.

In step 320, a determination is made as to whether the request needs translation. This determination may be made by any suitable algorithm. In one embodiment, step 320 may include accessing a data store to determine whether the request includes a reference that requires translation. In one embodiment, the data store may include a list of file and/or path names that require translation. Step 320 may thus entail searching, interrogating, or otherwise accessing a data store to determine whether a particular request requires translation. In some embodiments, the data store may be updated dynamically. If step 320 does determine that translation is warranted, method 300 proceeds to step 330; otherwise method 300 proceeds to step 340.

In step 330, the one or more references identified in the request as requiring translation are translated. Step 330 may be performed, for example, by various known string manipulation techniques. As has been described, step 330 may include translation of various types of data, including, but not limited to, path names, file names, system call names, and library call names. Steps 320 and 330 may be said to perform selective translation of a request received in step 310. Upon completion of step 330, method 300 proceeds to step 340.

In step 340, method 300 causes the request received in step 310 to be serviced. For example, the method may cause the request to be serviced by forwarding the request to an operating system 140, although the method is not limited in this respect. If in step 320 it is determined that request 130 does not in fact need to be translated, then step 340 will cause an untranslated version of the request to be serviced. Otherwise, step 340 will cause a translated version of the request to be serviced.

Method 300 may be used, for example, to permit a program that is not native to a particular computer system to execute on that computer system in a manner that reduces or eliminates compatibility errors (e.g., by translating requests to system resources that would result in errors if left untranslated). Method 300 may also be used to cause a program that is native to a particular computer system to execute in a different fashion on that system. For example, certain resources 150 of computer system 200 may be associated with a first system configuration, while other resources 150 may be associated with a second system configuration. Executing a native program 120 without translation of any resource requests may result in a certain program behavior corresponding with the first system configuration. By executing the same native program 120, but selectively translating the resource requests that it makes, the program behavior of native program 120 may thus differ correspondingly with the second system configuration in which the program is executed.

Turning now to FIGS. 4A-B, an illustration of a translation table 400 and an example 450 of a translation operation are depicted. Translation table 400 is an exemplary data structure that may be present in data store 240 to store information usable to determine whether translation of a particular reference included in a request is needed. Other types of data structures besides translation table 400 will be apparent to persons of skill in the relevant art.

Translation table 400 includes source locations (e.g., "/usr/include/sys/") and corresponding target locations to which these source locations are to be translated (e.g., "/x86/usr/include/sys/"). In this example, /usr/include/sys/ and /x86/usr/include/sys/ are directories. In one embodiment, upon a resource request (e.g., 130) being received, request translator 220 (e.g., in implementing method step 320) interrogates translation table 400 to determine if any references found in the request are present in table 400 (indicating a need for translation, in one embodiment). Thus, in one embodiment utilizing translation table 400, a reference in the request to /usr/include/sys/ and files and subdirectories contained therein will be translated by request translator 220 to contain a reference to /x86/usr/include/sys/. For example, in such an embodiment, a reference to /usr/include/sys/file1 would be translated to /x86/usr/include/sys/file1. Translation table 400 also includes various other entries, each indicating a condition signifying a need for translation (these entries may be thought of conceptually as translation "rules").

FIG. 4B includes an example 450 of sample translations of various references 460 to translated references 470.

Turning now to FIG. 5, an example 500 of translation of a code fragment is depicted. In example 500, code fragment 510 is shown as open ("/lib/ld.so.1", O_RDONLY), but this is merely exemplary. In one embodiment, code fragment corresponds to a system call made by a program (e.g., program 120) to access the file "/lib/ld.so.1" in a read-only mode. The code fragment 520 represents a sample translation of code fragment 510. In this particular example, the "open" system call takes as a parameter the path name of the file sought to be opened. The parameter (path name) to the "open" system call is altered, such that the code fragment, if passed to an operating system API, will cause the file "/translate/lib/ld.so.l" to be opened in a read-only mode, and return a file descriptor corresponding to the file "/translate/lib/ld.so.l".

Figure 6:
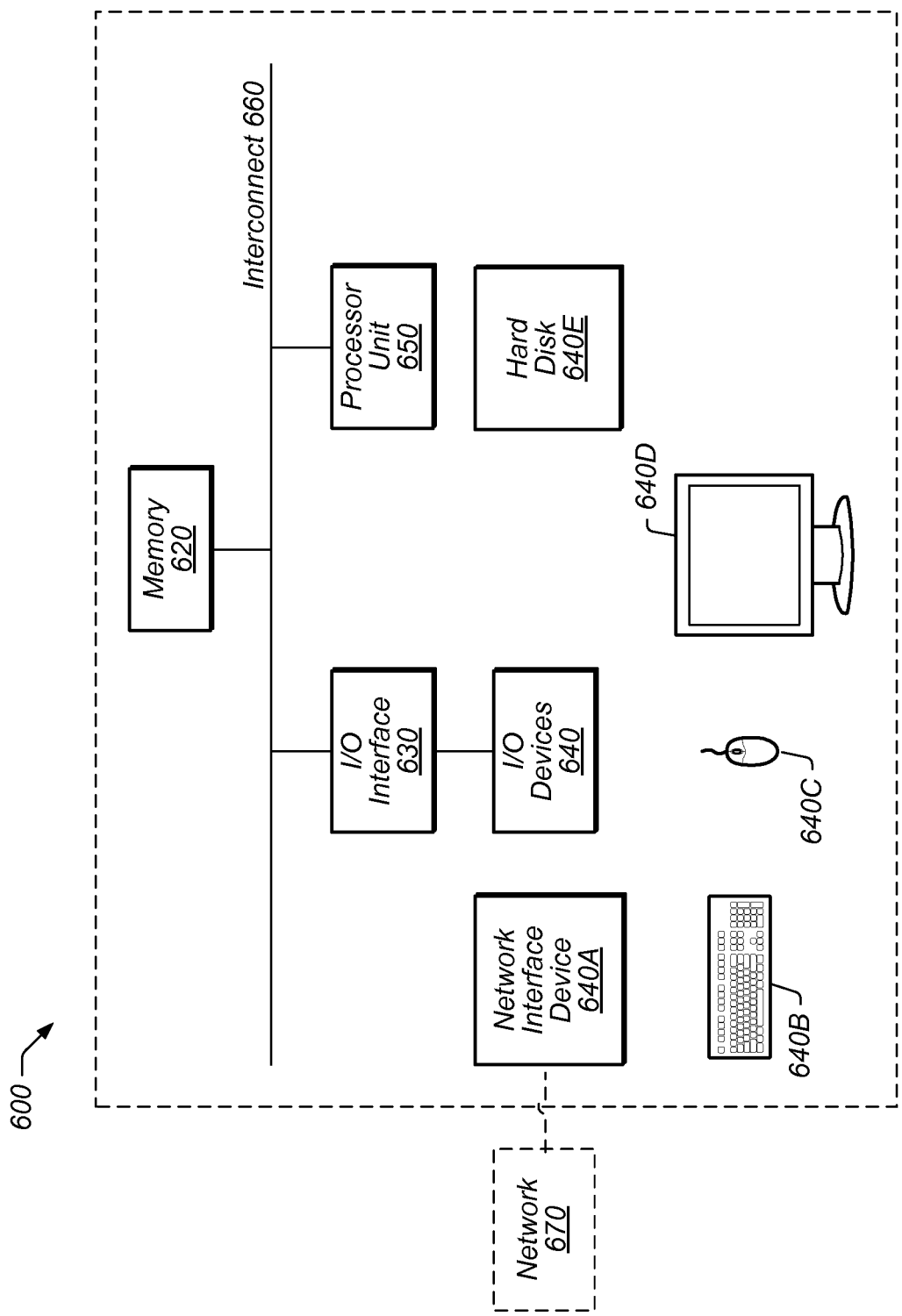
FIG. 6 is a block diagram of one embodiment of a computer system.

Turning now to FIG. 6, a block diagram of one embodiment of a computer system 600 is depicted. Computer system 600 is representative of any of the computer systems described herein (e.g., computer system 200), as well as any computer system or computing device that may employ the techniques described herein. Computer system 600 may be any suitable type of device, including, but not limited to, a personal computer system, desktop computer, laptop or notebook computer, mainframe computer system, handheld computer, workstation, network computer, a consumer device such as a mobile phone, pager, or personal data assistant (PDA). Computer system 600 may also be any type of networked peripheral device such as a storage device, switch, modem, router, etc. Although a single computer system 600 is shown in FIG. 6 for convenience, system 600 may also be implemented as two or more computer systems operating together.

As shown, computer system 600 includes a processor unit 650, memory 620, input/output (I/O) interface 630 coupled via an interconnect 660 (e.g., a system bus). I/O interface 630 is coupled to one or more I/O devices 640.

As described above, processor unit 650 includes one or more processors. In some embodiments, processor unit 650 includes one or more coprocessor units. In some embodiments, multiple instances of processor unit 650 may be coupled to interconnect 660. Processor unit 650 (or each processor within 650) may contain a cache or other form of on-board memory. In general, computer system 600 is not limited to any particular type of processor unit or processor subsystem.

Memory 620 is usable by processor unit 650 (e.g., to store instructions executable by and data used by unit 650). Memory 620 may be implemented by any suitable type of physical memory media, including hard disk storage, floppy disk storage, removable disk storage, flash memory, random access memory (RAM-SRAM, EDO RAM, SDRAM, DDR SDRAM, Rambus® RAM, etc.), ROM (PROM, EEPROM, etc.), and so on. Memory 620 may consist solely of volatile memory in one embodiment.

Memory in computer system 600 is not necessarily limited to memory 620. Rather, computer system 600 may be said to have a "memory subsystem" that includes various types/locations of memory. For example, the memory subsystem of computer system 600 may, in one embodiment, include memory 620, cache memory in processor unit 650, storage on I/O devices 640 (e.g., a hard drive, storage array, etc.), and so on. Accordingly, the phrase "memory subsystem" is representative of various types of possible memory media within computer system 600. The memory subsystem of computer 600 may stores program instructions executable by processor unit 650, including program instructions executable to implement the various techniques disclosed herein.

I/O interface 630 may represent one or more interfaces and may be any of various types of interfaces configured to couple to and communicate with other devices, according to various embodiments. In one embodiment, I/O interface 630 is a bridge chip from a front-side to one or more back-side buses. I/O interface 630 may be coupled to one or more I/O devices 640 via one or more corresponding buses or other interfaces. Examples of I/O devices include storage devices (hard disk (e.g., 640E), optical drive, removable flash drive, storage array, SAN, or an associated controller), network interface devices (e.g., 640A, which may couple to a local or wide-area network), user interface devices (e.g., mouse 640B, keyboard 640C, display monitor 640D) or other devices (e.g., graphics, sound, etc.). In one embodiment, computer system 600 is coupled to a network 670 via a network interface device 640A. I/O devices 640 are not limited to the examples listed above.

Computer system 600 may be used to implement the various techniques described herein. In one embodiment, one or programs may be stored within the memory subsystem of system 600 (e.g., on hard disk 640E). Upon being invoked, portions of the one or more programs may be loaded into memory 620 (random access memory, in one embodiment) and executed on processor unit 650 to implement, for example, embodiments of request translator 220 described herein. In one embodiment, computer system 600 is a server storing one or more programs executable to implement request translator 220 and configured to download the one or more programs to requesting client computer systems.

Articles of manufacture that store instructions (and, optionally, data) executable by a computer system to implement various techniques disclosed herein are also contemplated. These articles of manufacture include tangible computer-readable memory media. The contemplated tangible computer-readable memory media include portions of the memory subsystem of computer system 600 (without limitation SDRAM, DDR SDRAM, RDRAM, SRAM, flash memory, and of various types of ROM, etc.), as well as storage media or memory media such as magnetic (e.g., disk) or optical media (e.g., CD, DVD, and related technologies, etc.). The tangible computer-readable memory media may be either volatile or nonvolatile memory.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A non-transitory computer-readable memory medium having program instructions stored thereon that are executable by a computer system to cause the computer system to:

receive, from a program executing on the computer system, an initial request to access a first resource of the computer system, wherein the initial request includes a reference for the first resource that specifies a first location that includes a path within a file system of the computer system, wherein the program is attempting to access the first resource at the first location;

determine, based at least in part on the specified first location, that the reference for the first resource requires translation;

in response to determining that the reference for the first resource requires translation, alter the initial request by translating the reference for the first resource, wherein the translated reference specifies a second location within the computer system at which a second resource exists, wherein the second location is different from the first location; and cause the altered request to be serviced based, at least in part, on the specified second location;

wherein the first and second locations are respectively indicative of first and second sets of machine instructions that are executable by a processor of the computer system to cause the computer system to perform operations that do not include translation of the first resource;

wherein servicing the initial request would cause execution of the first set of executable instructions, and wherein servicing the altered request includes causing the second set of executable instructions to be executed in response to the initial request.

2. The non-transitory computer-readable memory medium of claim 1, wherein a portion of the first resource is indicated in the initial request and includes one or more first executable stored instructions, and wherein a portion of the second resource is indicated in the altered request, wherein the portion of the second resource includes one or more second executable stored instructions that are identical to the one or more first executable stored instructions.

3. The non-transitory computer-readable memory medium of claim 1, wherein the program executing on the computer system is not native to the computer system.

4. The non-transitory computer-readable memory medium of claim 1, wherein the program instructions are executable by the computer system to cause a particular request to be serviced in response to determining that the particular request does not include a reference that requires translation; and
wherein the first resource corresponds to an operating system of the computer system.

5. The non-transitory computer-readable memory medium of claim 1, wherein the stored program instructions are part of an operating system of the computer system.

6. The non-transitory computer-readable memory medium of claim 1, wherein the stored program instructions are within an application executable on an operating system of the computer system to control the execution of the program.

7. The non-transitory computer-readable memory medium of claim 1, wherein the first and second resources are the same.

8. The non-transitory computer-readable memory medium of claim 1, wherein the path within the file system is an uncompressed path, and wherein the path includes a directory location.

9. The non-transitory computer-readable memory medium of claim 1, wherein the first resource does not exist at the first location within the computer system at which the program is attempting to access the first resource.

10. The non-transitory computer-readable memory medium of claim 1, wherein the second resource is not identical to the first resource.

11. The non-transitory computer-readable memory medium of claim 1, wherein the reference is to one of the following objects: a file, a directory, an object in a memory region of the computer system in use by an operating system of the computer system.

12. The non-transitory computer-readable memory medium of claim 1, wherein a portion of the first resource is indicated in the initial request and includes first executable stored instructions, and wherein the altered request indicates a portion of the second resource that includes one or more second executable stored instructions that are different than one or more of the first executable stored instructions.

13. The non-transitory computer-readable memory medium of claim 1, wherein the reference includes a first file name and a first path name, and wherein the translated reference includes a second file name and a second path name.

14. The non-transitory computer-readable memory medium of claim 13, wherein the first and second file names are the same, but the first and second path names are different.

15. The non-transitory computer-readable memory medium of claim 1, wherein the path within the file system includes at least one of a directory or a file name.

16. The non-transitory computer-readable memory medium of claim 1, wherein at least one of the first and second sets of machine instructions includes instructions in one or more formats that are compatible with one or more architectures supported by the processor.

17. A method implemented by a computer system, the method comprising:
receiving, from a program running on the computer system, an initial request to access a first resource of the computer system, wherein the initial request includes at least one reference for at least the first resource that specifies a first location that includes a path within a file system of the computer system, wherein the program is attempting to access the first resource at the first location;
the computer system translating the at least one reference in response to determining that the at least one reference requires translation, wherein the determining is based at least in part on the specified first location, and wherein the translated reference specifies a second location within the computer system at which a second resource exists, wherein the second location is different from the first location; and
the computer system causing an altered request including the at least one translated reference to be serviced based, at least in part, on the specified second location;
wherein the first and second locations are respectively indicative of first and second sets of machine instructions that are executable by a processor of the computer system to cause the computer system to perform operations other than translation of the first resource;
wherein servicing the initial request would cause execution of the first set of executable instructions, and wherein servicing the altered request includes causing the second set of executable instructions to be executed in response to the initial request.

18. The method of claim 17, wherein the initial request indicates zero or more function arguments and a portion of the first resource that corresponds to an executable function for the zero or more function arguments, and wherein the altered request indicates the zero or more function arguments and a portion of the second resource that also corresponds to the executable function for the zero or more arguments.

19. A computer system, comprising:
a processor unit; and
a memory having program instructions stored thereon that are executable by the processor unit to cause the computer system to perform operations comprising:
receiving an initial request from a program running on the computer system to access a first resource controlled by an operating system of the computer system, wherein the initial request includes a reference that specifies a first location that includes a path within a file system of the operating system of the computer system, wherein the program is attempting to access the first resource at the first location;
selectively translating the reference included within the initial request, wherein a translation of the reference specifies a second location that is different from the first location, and wherein a second resource exists within the computer system at the second location; and
causing an altered request including the translated reference to be serviced based, at least in part, on the specified second location;
wherein the first and second locations are respectively indicative of first and second sets of machine instructions that are executable by a processor of the computer system to cause the computer system to perform operations that do not include translation of the first resource;
wherein servicing the initial request would cause execution of the first set of executable instructions, and wherein servicing the altered request includes causing the second set of executable instructions to be executed in response to the initial request.

20. The computer system of claim 19, wherein the initial request is from a program that is not native to the computer system, and wherein the translation of the reference includes one or both of the following: translated path name, translated file name.

* * * * *